May 8, 1934.  J. H. SIMPSON, JR., ET AL  1,958,116
BRAKE LINING AND METHOD OF MAKING THE SAME
Filed Dec. 3, 1930
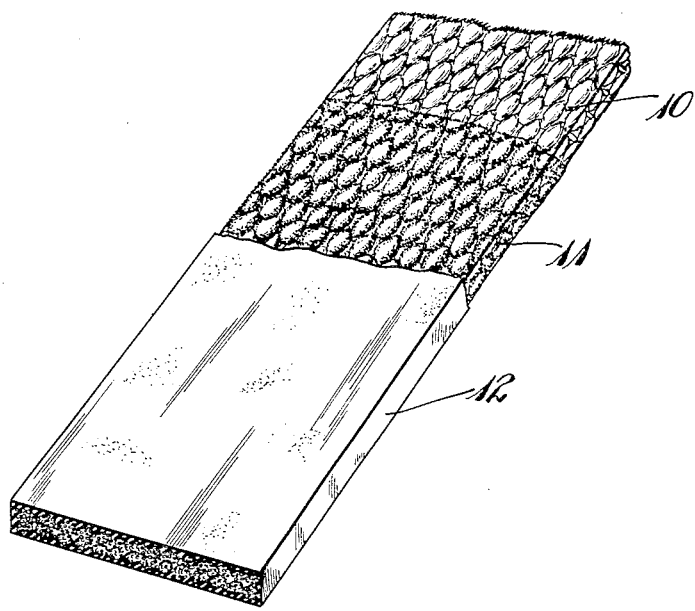
Inventors
John Henry Simpson Jr.
Allan B. Merrill
By Eakin & Avery
Attys.

Patented May 8, 1934

1,958,116

UNITED STATES PATENT OFFICE 1,958,116

BRAKE LINING AND METHOD OF MAKING THE SAME

John Henry Simpson, Jr., Philadelphia, Pa., and Allan B. Merrill, Akron, Ohio, assignors of one-half to J. Sullivan & Sons Manufacturing Company, Philadelphia, Pa., a corporation of Pennsylvania, and one-half to The B. F. Goodrich Company, New York, N. Y., a corporation of New York Application December 3, 1930, Serial No. 499,764

2 Claims. (Cl. 18—59)

Our invention relates to brake linings and methods of making the same and particularly to brake linings of asbestos and metal wires which are woven to determinate width.

Heretofore brake linings have been made of woven material including asbestos and metallic wire produced in continuous lengths from which the repair man could cut the desired length and bend it to the desired curvature for use. This material has the advantage of requiring the service station to stock only a limited number of widths and thicknesses. Heretofore, however, such linings have had certain disadvantages which have made their use undesirable. It is impossible to weave such linings to uniform thickness because of which when the lining is first applied it contacts the drum only in spots, and the brake does not fit correctly until the lining is partly worn away. Another disadvantage is that such brake linings are relatively hard and are inclined to score the drum before wearing to a smooth surface. Another disadvantage is that these linings are more or less absorbent of oil and moisture. A still further disadvantage is that if made hard enough to give sufficient wear resistance they cause undesirable noise when applied to the drums.

It has been proposed to manufacture individual brake linings of hard molded material. These molded linings have certain advantages over the flexible linings of the prior art, in that they are more uniform in thickness. They have, however, the disadvantage that a service station is required to stock a great many types in order to accommodate cars of various makes and types. They also require expensive individual molds in their manufacture.

One of the objects of our invention is to produce a flexible lining made in continuous lengths and having a uniform thickness.

Other objects are to provide a structure which will have superior braking ability, which will avoid scoring of the brake drum, and which will be quiet in operation.

Other objects will appear from the following description.

The accompanying drawing is a perspective view of a piece of brake lining made according to our invention, showing parts broken away to illustrate the layers of the same.

Referring to the drawing, in constructing the brake lining of our invention we first produce a core, preferably woven, of material such as asbestos or the like or a mixture of mineral fibers and vegetable fibers, reinforced by fine metallic wire. This core is similar to the flexible, woven brake linings which are well known in the art and may be woven in any desired manner, but is preferably made with a tight selvage edge. In constructing this core allowance preferably is made for the application of the molded covering hereinafter described. The core is indicated in the drawing by the numeral 10.

Having produced a core in a continuous length, we next apply a coating or impregnating composition thereto. In doing this, we may first buff or otherwise scuff the surface of the core to roughen the same, although we have found that the scuffing operation may be dispensed with. The coating or impregnation preferably is of a bituminous material, which may be applied in any well known manner as by hot dipping, and is congealed, as by cooling, to form the coating or impregnation represented in the drawing by the numeral 11. The coating should be of such a nature that it will strongly adhere to the vulcanizable covering which is to be applied thereto.

The next step is to apply to the core a covering 12 of a material such as a vulcanizable soft-rubber composition. This material may be applied as a calendered sheet of vulcanized rubber composition and then vulcanized under mold pressure. Other methods of applying the covering may be employed such as extruding the vulcanizable material onto the core or applying a dispersion of the material in a solvent or non-solvent liquid. In case a dispersion is used, the dispersion medium should be eliminated before molding the article.

The brake lining is then confined in a suitable mold and the vulcanizable material is forced into the interstices of the core and the article is formed to uniform thickness under pressure. Heat is applied to the mold to vulcanize the covering material, in the case of a vulcanized cover. For this purpose we employ a hydraulic press fitted with a suitable mold or platens having means for applying heat thereto.

The covering material, preferably a vulcanizable rubber composition, may contain suitable vulcanizing agents and fillers, pigments, and the like, to produce a compound having the properties of flexibility, and resistance to moisture, wear and heat. By including certain materials in the covering composition such as asbestos fiber, the resistance to heat and coefficient of friction may be increased as desired. By including other materials such as graphite, the coefficient of friction may be reduced as desired.

The resulting brake lining is uniform in thickness and therefore provides greater, more resilient, and more uniform contact with the brake drum than is possible with ordinary woven flexible brake linings, and it also may be molded to width. Our brake lining, being flexible and produced in continuous lengths, may be cut to fit any brake and therefore has advantages over individually molded brake linings. Also, bending the lining to shape puts its inner surface region under circumferential compression and thereby increases its resistance to abrasion. The bituminous binder and the rubber composition, when those materials are used, strongly unite and effectively tie the cover to the core in the vulcanizing process.

We claim:

1. A flexible brake lining strip of a length suitable for a plurality of brake linings to be cut therefrom, said strip comprising a fibrous core impregnated with a bituminous material and a resilient friction facing of rubber composition completely surrounding the core, the said rubber composition on all of the lateral faces of the core including the edge faces being of substantially uniform thickness and mold vulcanized to shape.

2. The method of making a brake-lining strip which comprises impregnating with a bituminous material a fibrous core of such length as to provide for cutting a plurality of brake linings from the finished product, applying a layer of rubber composition of substantially uniform thickness to all of the lateral faces of the core including the edge faces and mold-vulcanizing the resulting assembly to shape with application of mold-shaping pressure to all of the said lateral faces.

JOHN HENRY SIMPSON, JR.
ALLAN B. MERRILL.